:::

(12) United States Patent
Cheng et al.

(10) Patent No.: US 12,108,299 B2
(45) Date of Patent: Oct. 1, 2024

(54) RELAY SELECTION AND RESELECTION

(71) Applicant: MediaTek INC., Hsinchu (TW)

(72) Inventors: Ming-Yuan Cheng, Hsinchu (TW);
Nathan Edward Tenny, San Jose, CA (US); Guan-Yu Lin, Hsinchu (TW);
Xuelong Wang, Beijing (CN)

(73) Assignee: MediaTek Inc., Hsinchu (TW)

( * ) Notice: Subject to any disclaimer, the term of this patent is extended or adjusted under 35 U.S.C. 154(b) by 355 days.

(21) Appl. No.: 17/734,305

(22) Filed: May 2, 2022

(65) Prior Publication Data
US 2022/0361076 A1  Nov. 10, 2022

Related U.S. Application Data

(63) Continuation of application No. PCT/CN2021/091886, filed on May 6, 2021.

(30) Foreign Application Priority Data

Apr. 19, 2022 (CN) .......................... 202210410652.7

(51) Int. Cl.
*H04W 36/30* (2009.01)
*H04W 36/22* (2009.01)
*H04W 48/10* (2009.01)
*H04W 88/04* (2009.01)
*H04W 92/10* (2009.01)
*H04W 92/18* (2009.01)

(52) U.S. Cl.
CPC ........... *H04W 36/30* (2013.01); *H04W 36/22* (2013.01); *H04W 48/10* (2013.01); *H04W 88/04* (2013.01); *H04W 92/10* (2013.01); *H04W 92/18* (2013.01)

(58) Field of Classification Search
CPC ..... H04W 36/30; H04W 36/22; H04W 48/10; H04W 88/04; H04W 92/10; H04W 92/18; H04W 8/005; H04W 36/033; H04W 48/14; H04W 40/12; H04W 28/0827; H04W 28/0967; H04W 40/22
See application file for complete search history.

(56) References Cited

U.S. PATENT DOCUMENTS

| | | | | |
|---|---|---|---|---|
| 2017/0013653 A1* | 1/2017 | Suzuki | .................. | H04W 8/005 |
| 2023/0079552 A1* | 3/2023 | Back | ..................... | H04W 40/20 |
| | | | | 370/315 |
| 2023/0300713 A1* | 9/2023 | Hoang | ................... | H04L 67/51 |
| | | | | 370/254 |

OTHER PUBLICATIONS

Xian, He, et al. "The impact of channel environment on the RSRP and RSRQ measurement of handover performance." 2011 international conference on electronics, communications and control (ICECC). IEEE, 2011. (Year: 2011).*

(Continued)

*Primary Examiner* — Sharad Rampuria
(74) *Attorney, Agent, or Firm* — Helen Mao; Zheng Jin; Imperium Patent Works

(57) ABSTRACT

Mechanism of relay UE discovery and relay UE selection and reselection for remote UE data transmission with a serving base station via relay UE is proposed. A method operable for relay UE selection and reselection of remote UE is provided. The UE considers additional criteria such as relay load other than purely radio signal quality (e.g., RSRP) criteria. The relay load can serve different purpose for relay UE and remote UE. The relay load can be the criteria for UE to become a relay UE or not. It can be the criteria for a remote UE to select another UE as its relay UE.

18 Claims, 4 Drawing Sheets

BASIC:

BASELINE + ENHANCEMENT:

(56) References Cited

OTHER PUBLICATIONS

Taiwan IPO, office action for the Taiwanese patent application 111116940 (no English translation is available), dated Dec. 27, 2022 (14 pages).
R2-2104297, Huawei, HiSilicon, "Summary of 8.7.2 relay discovery", 3GPP TSG-RAN WG2 Meeting #113bis-e, sections 2.0, 2.2.1, 2.2.2, 2.7.3, 2.7.4, dated Apr. 12-20, 2021 (17 pages).
R2-2104262, Philips, "Relay UE load as an additional AS criterion for relay (re-)selection", 3GPP TSG-RAN WG2 Meeting #113-bis-e, sections 1, 2.1, 2.3, 2.4, dated Apr. 12-20, 2021 (6 pages).
R2-2009837, Google Inc., "Transmission of Sidelink UE Information NR", 3GPP TSG-RAN2 Meeting #112-e, section 5.3.5.3, dated Nov. 2-13, 2020 (9 pages).
R2-2103007, OPPO, "Discussion on NR sidelink relay UE (re-)selection", 3GPP TSG-RAN WG2 Meeting #113 bis electronic, sections 2.1, 2.2, 2.3, dated Apr. 12-20, 2021 (5 pages).

\* cited by examiner

RELAY SELECTION AND RESELECTION

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2021/091886, entitled "Relay Selection and Reselection", with an international filing date of May 6, 2021. This application claims priority under 35 U.S.C. § 119 from Chinese application CN202210410652.7 filed on Apr. 19, 2022. The disclosure of each of the foregoing documents is incorporated herein by reference.

TECHNICAL FIELD

The disclosed embodiments relate generally to wireless communication, and, more particularly, to method of UE relay selection and reselection in 5G NR cellular network supporting UE sidelink relaying via PC5 interface.

BACKGROUND

Third generation partnership project (3GPP) and LTE/NR mobile telecommunication systems provide high data rate, lower latency and improved system performances. In 3GPP LTE/NR networks, an evolved universal terrestrial radio access network (E-UTRAN) includes a plurality of base stations, e.g., eNBs/gNBs communicating with a plurality of mobile stations referred as user equipment (UEs). Orthogonal Frequency Division Multiple Access (OFDMA) has been selected for LTE downlink (DL) radio access scheme due to its robustness to multipath fading, higher spectral efficiency, and bandwidth scalability. Multiple access in the downlink is achieved by assigning different sub-bands (i.e., groups of subcarriers, denoted as resource blocks (RBs)) of the system bandwidth to individual users based on their existing channel condition.

To meet the demand of this exponential increase in communications, additional spectrum (i.e. radio frequency spectrum) is needed. As compared to WiFi and NR unlicensed spectrum operation, a PC5 link (or sidelink) based mobile device potentially possesses the following features: 1) deployment by both operator and user; 2) operation in both unlicensed spectrum and licensed spectrum; 3) similar protocol stacks complexity to WiFi; 4) better multiplexing efficiency; 5) better mobility support, e.g., service continuity; 6) larger maximal TX power for larger coverage; 7) support multi-hop relay.

When a remote UE cannot find a base station to camp on or its link quality to base station is too weak, the remote UE will try to find a relay UE for forwarding data. The relaying initiation of the remote UE includes both relay discovery procedures and relay UE selection or reselection procedures, as a precondition for sidelink relay operation. In general, relay discovery and relay UE selection or reselection occur sequentially. The remote UE may obtain multiple relay UE candidates that fulfills the discovery criteria and then selection needs to be made to select one of the relay UEs.

In some usage, coverage extension of base station can be achieved by deploying relay UEs, relay UE can help remote UE to forward/relay data to/from base station. To be specific, for a remote UE, it is allowed to access network without direct communicate with base station via Uu interface. Instead, the remote UE only communicates with relay UE that helps to forward/relay data for remote UE. A sidelink relay connection may be configured by a configuration message sent from base station through relay UE to remote UE; the configuration message may include any necessary parameters for relay operation, as well as other parameters needed to set up and maintain the connection. This disclosure addresses the mechanism how a remote UE to select a relay UE responsible for its data transmission to/from base station.

SUMMARY

Mechanism of relay UE discovery and relay UE selection and reselection for remote UE data transmission with a serving base station via relay UE is proposed. A method operable for relay UE selection and reselection of remote UE is provided. The UE considers additional criteria such as relay load other than purely radio signal quality (e.g., RSRP) criteria. The relay load can serve different purpose for relay UE and remote UE. The relay load can be the criteria for UE to become a relay UE or not. It can be the criteria for a remote UE to select another UE as its relay UE.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
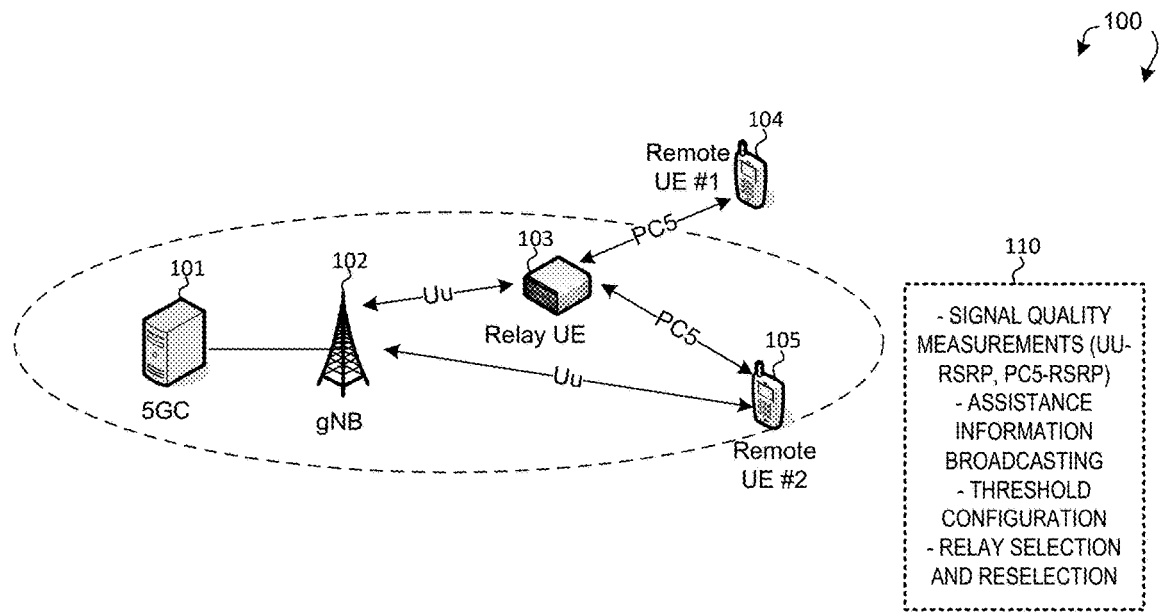
FIG. 1 illustrates a wireless cellular communications system supporting UE-to-network sidelink relay for a remote UE via a relay UE and relay discovery and selection/reselection in accordance with a novel aspect.

FIG. 1 illustrates a wireless cellular communications system supporting UE-to-network sidelink relay for a remote UE via a relay UE and relay discovery and selection/reselection in accordance with a novel aspect. 5G new radio (NR) mobile communication network 100 comprises a 5G core (5GC) 101, a base station gNB 102, and a plurality of user equipments UE 103, UE 104, and UE 105. For in-coverage UEs, a base station can schedule data traffic over Uu link. For out-of-coverage UEs, a relay UE can schedule data traffic over PC5 (or sidelink (SL)). In FIG. 1, UE 103 is a radio resource control (RRC)-connected UE that acts as a mobile device relay using PC5 (or SL) to relay data traffic to/from end remote UEs for coverage extension. Remote UE 104 is out of network coverage. Relay UE 103 helps to relay all data traffic for remote UE 104. Remote UE 105 is connected to the network via Uu link but the link quality may be poor. Relay UE 103 helps to relay part or all data traffic for remote UE 105. Relay UE 103 operates to relay communications between UE 104/105 and the network, thus allowing the network to effectively extend its coverage to the remote UEs.

Cell selection and reselection within a UE is a common behavior in cellular network and well investigated. However, under the support of relay operation, a remote UE now has more opportunities and candidates to select from, because a relay UE is also a possible node to be selected for data transmission. Note that the interface between remote UE and relay UE is PC5 interface, while the interface between remote UE and base station is Uu interface. In relay operation, relay UE selection is required before data transmission. Relay reselection is required when the link quality to original relay UE's become too weak, and another relay UE has better link quality and service than original relay UE. Relay reselection may also be required when the link to an original relay UE is no longer available, e.g., because the original relay UE experiences a connectivity problem or ceases operating as a relay UE.

Relay UE selection and reselection could be used on the basis of sidelink relay architecture. There are two categories in the relay scenarios. For the first category, the remote UE (e.g., UE 105) is in coverage of base station, the reason for remote UE to select a relay UE is due to bad signal strength from base station, the remote UE wants a better service, throughput or latency, then, remote UE will try to find a relay UE with better signal strength or service than directly connect to base station. For the second category, the remote UE (e.g., UE 104) is not in the coverage of base station, remote UE has no chance to camp on base station and must find a relay UE to connect to base station indirectly.

In accordance with one novel aspect, a method of data transmission through a relay UE for a remote UE is proposed. In an aspect of the disclosure, a method operable for relay UE selection and reselection of remote UE is provided (as depicted by 110). UE first measures its signal strength of the base station, e.g., Uu-RSRP, and determines whether it can become a relay UE or a remote UE by comparing the Uu-RSRP with a threshold. The relay UE transmits a fixed pattern of its signal (e.g., a reference signal), and the remote UE measures relay UE's signal strength (e.g., PC5-RSRP) via the fixed pattern of signal. In addition, the relay UE can also broadcast other assistance information for remote UE to consider during relay UE selection and reselection. The assistance information can be its loading information, its link quality information associated to base station, its battery status, and so on. A remote UE can do filtering on the relay UE according to its relay service code, its signal strength, and a remote UE can also rank the relay UEs based on one or more criteria, e.g., its signal strength and/or criteria derived from the broadcasted assistance information from the relay UEs. Based on the ranking results, the remote UE selects one of the relay UEs as a relay node to be responsible for forwarding/relaying data to/from the base station.

Figure 2:
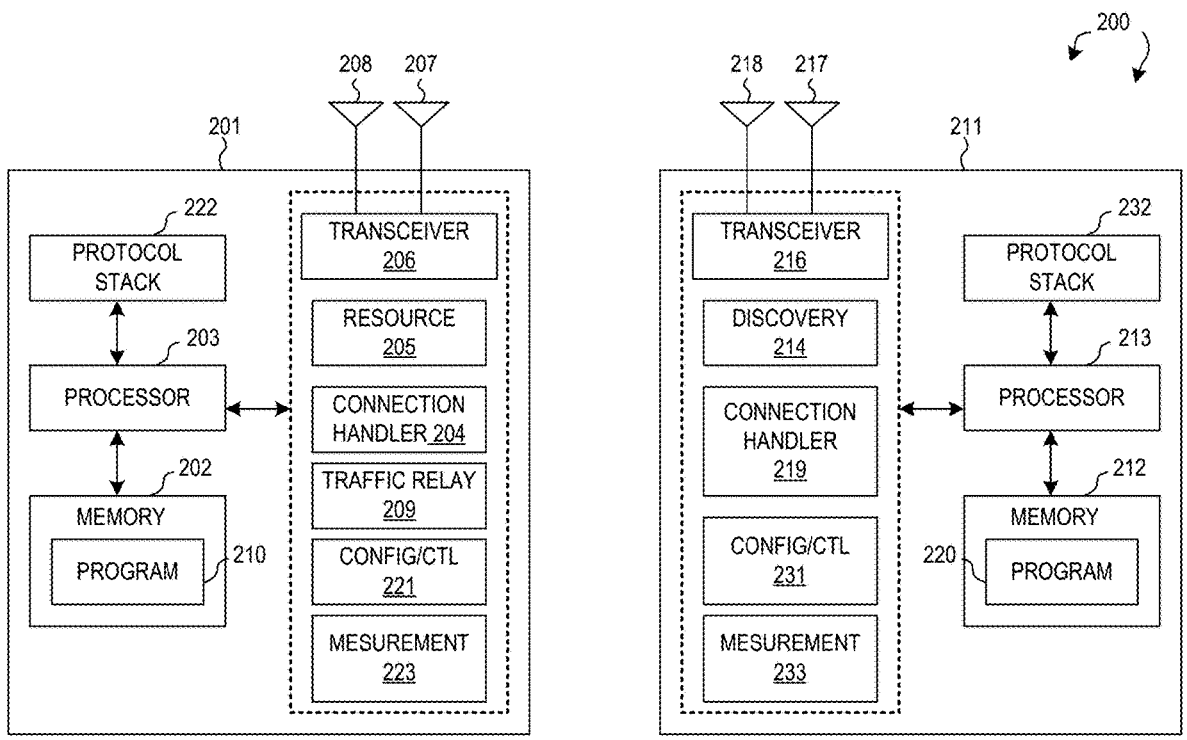
FIG. 2 is a simplified block diagram of a wireless transmitting device and a receiving device in accordance with embodiments of the current invention.

FIG. 2 is a simplified block diagram of wireless devices 201 and 211 in accordance with a novel aspect. For wireless device 201 (e.g., a relay UE), antennae 207 and 208 transmit and receive radio signal. RF transceiver module 206, coupled with the antennae, receives RF signals from the antenna, converts them to baseband signals and sends them to processor 203. RF transceiver 206 also converts received baseband signals from the processor, converts them to RF signals, and sends out to antennae 207 and 208. Processor 203 processes the received baseband signals and invokes different functional modules and circuits to perform features in wireless device 201. Memory 202 stores program instructions and data 210 to control the operations of device 201.

Similarly, for wireless device 211 (e.g., a remote UE), antennae 217 and 218 transmit and receive RF signals. RF transceiver module 216, coupled with the antennae, receives RF signals from the antennae, converts them to baseband signals and sends them to processor 213. The RF transceiver 216 also converts received baseband signals from the processor, converts them to RF signals, and sends out to antennae 217 and 218. Processor 213 processes the received baseband signals and invokes different functional modules and circuits to perform features in wireless device 211. Memory 212 stores program instructions and data 220 to control the operations of the wireless device 211.

The wireless devices 201 and 211 also include several functional modules and circuits that can be implemented and configured to perform embodiments of the present invention. In the example of FIG. 2, wireless device 201 is a relay UE that includes a protocol stack 222, a measurement circuit 223 for measuring radio signal strength and quality, a resource management circuit 205 for allocating and scheduling sidelink resources, a connection handling circuit 204 for establishing and managing connections, a traffic relay handling controller 209 for relaying all or part of control signaling and/or data traffic for remote UEs, and a control and configuration circuit 221 for determining and providing control and configuration information for relay selection and reselection. Wireless device 211 is a remote UE that includes a protocol stack 232, a measurement circuit 233 for measuring radio signal strength and quality, a relay discovery circuit 214 for discovering relay UEs, a connection handling circuit 219 for establishing and managing connections, and a configuration and control circuit 231 for relay selection and reselection. The different functional modules and circuits can be implemented and configured by software, firmware, hardware, and any combination thereof. The function modules and circuits, when executed by the processors 203 and 213 (e.g., via executing program codes 210 and 220), allow relay UE 201 and remote UE 211 to perform embodiments of the present invention.

Figure 3:
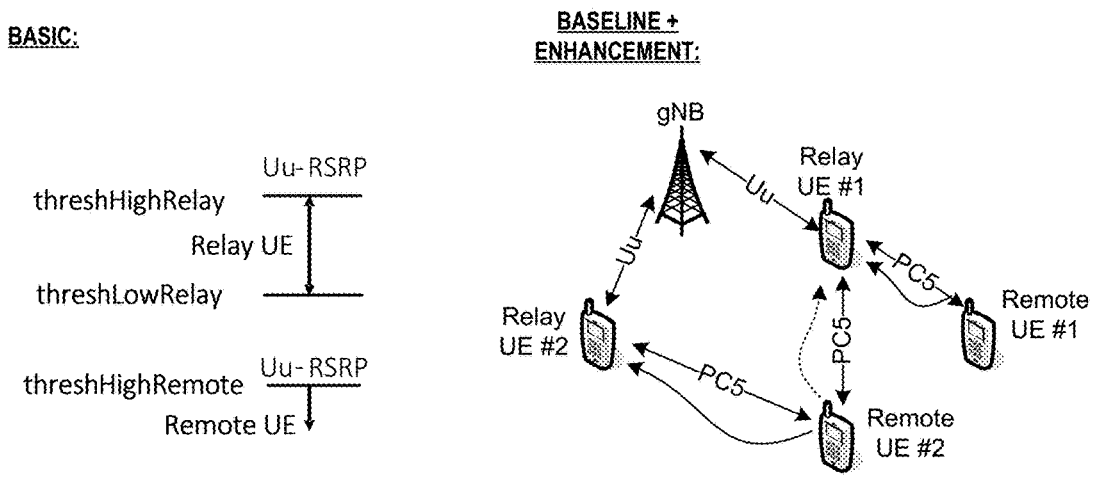
FIG. 3 illustrates one embodiment of relay selection and reselection using both baseline and enhanced criterion in accordance with one novel aspect.

FIG. 3 illustrates one embodiment of relay selection and reselection using both baseline and enhanced criterion in accordance with one novel aspect. When a remote UE powers on or when its link quality to base station is too weak, the remote UE needs to search and decide which relay UE is responsible for forwarding uplink traffic from remote UE to base station and forwarding downlink traffic from base station to remote UE. Under relay architecture and one novel aspect of the present invention, a UE can become Relay UE if its measured Uu Signal is good enough (e.g., >threshLowRelay) to be a useful relay, but not so good (e.g., <=threshHighRelay) that it will interfere with the gNB. A UE can become a Remote UE if its measured Uu signal is sufficiently bad (e.g., <=threshHighRemote).

Regarding the relay UE part, during the discovery procedure, relay UE should broadcast Relay Service Codes (RSC) in discovery message, which is in NAS layer. Another mechanism to optimize latency is to introduce RSC into AS layer (e.g., carry RSC in MAC PDU header to allow early packet filtering). When remote UE finds the correct RSC from Relay UE that it can use, the remote UE can treat this relay UE as possible candidates, then the discovery procedure is considered completed. Besides basic discovery procedure (use Uu link quality to base station), a UE can use other metrics (e.g., Uu throughput from base station, relay load, etc.) to decide whether the UE should become a relay UE or not to optimize performance of sidelink relay.

From remote UE part, a remote UE can select a relay UE purely based on its PC5 signal quality, i.e., remote UE select the relay UE with best signal quality. However, the best signal quality doesn't mean the remote UE can get better service. In some situations, remote UE can get better services when selecting another relay UE without the best PC5 signal quality. Such case could be because the relay UE has the best PC5 signal quality but has worse Uu signal quality or there are too many remote UEs attaching to the relay UE, thus the resource are shared by too many remote UEs. In such case, remote UE can select a relay UE configured with a less crowded resource pool for sidelink transmission. The individual remote UE can fulfil the requirements when the less crowded resource pool is used. In the example of FIG. 3, Remote UE #1 selects Relay UE #1 based on PC5 signal quality (baseline), while Remote UE #2 selects Relay UE #2 considering both PC5 signal quality (baseline) and loading information (enhancement).

Figure 4:
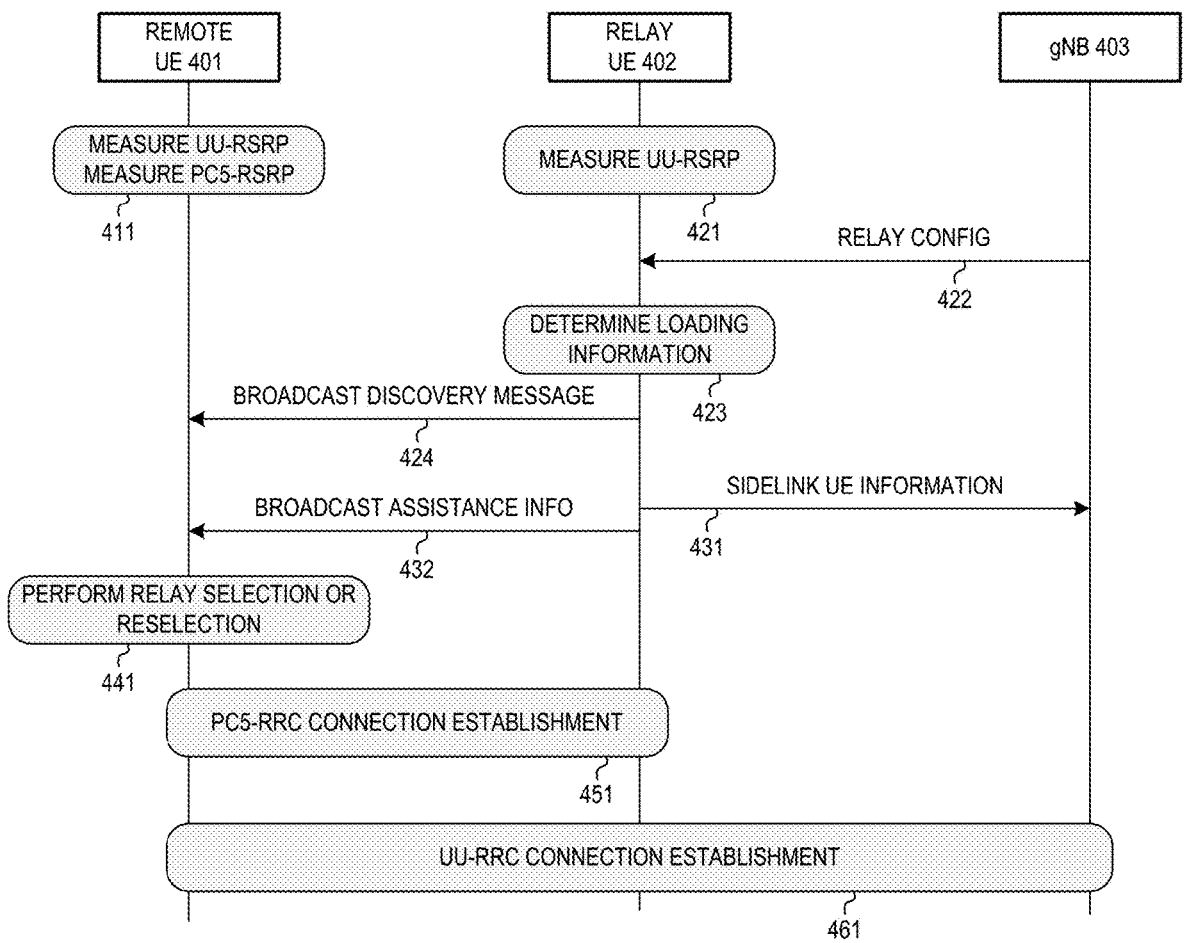
FIG. 4 illustrates a signal flow between remote UE, relay UE, and the base station for relay UE discovery and relay selection/reselection in accordance with one novel aspect.

FIG. 4 illustrates a signal flow between remote UE, relay UE, and the base station for relay UE discovery and relay selection/reselection in accordance with one novel aspect. In step 411, remote UE 401 measures its Uu signal quality Uu-RSRP. A UE can become a Remote UE if its measured Uu signal is sufficiently bad (e.g., <=threshHighRemote). For in-coverage remote UE, because it is still in coverage of base station, remote UE 401 can measure Uu-RSRP, and can compare Uu-RSRP with PC5-RSRP directly or indirectly. For out-of-coverage remote UE, there is no base station involved, there is no need for remote UE to measure Uu link quality, remote UE 401 only needs to consider relay UE part. UE 401 also measures PC5-RSRP over PC5 interfaces with other candidate relay UEs for the purpose of relay selection.

In step 421, UE 402 measures its Uu signal quality Uu-RSRP and determines to become a relay UE if its measured Uu-RSRP is good enough (e.g., >threshLowRelay) to be a relay UE, but not so good (e.g., <=threshHighRelay) that it will interfere with gNB 403. For enhanced relay selection/reselection, gNB 403 can configure a load threshold to UE 402 (step 422). If the load of UE 402 is below the configured threshold, then UE 402 can serve as a relay UE (step 423). In step 424, relay UE 402 broadcasts discovery message to candidate remote UE 401, or send response message as response to the discovery request from a candidate remote UE.

The load threshold may be defined in terms of various metrics, e.g., a maximum throughput on the UE's Uu interface, a maximum density of required resource grants on the UE's Uu interface, and so on. In some embodiments, the load threshold may be related to the UE's operation as a relay UE. For example, if the UE is already operating as a relay UE for one or more remote UEs, the network may configure a load threshold to the UE that controls whether it may continue to accept additional remote UEs and operate as a relay UE for the additional remote UEs. In such a case, the load threshold may be defined at least in part in terms of the relay UE's current relaying operation, e.g., a maximum number of served remote UEs, a maximum throughput of relayed data traffic, etc.

From latency point of view, it is possible that relay UE is also connected to another relay UE to base station, i.e., multiple hop case. It is obvious that more hops to base station means more latency. For some services on the remote UE, it is not acceptable to have too longer delay. Thus, the number of hops between a relay UE to gNB can be an criteria for remote UE to select relay UE, in particular when the remote UE has a tight latency requirement requested by the supported applications, traffic, and QoS flow.

In order to improve system performance, a relay UE can provide information to gNB (e.g. via RRC message such as SidelinkUEInformation or via UE assistance information) or to remote UE (e.g. via broadcast or unicast, e.g. via PC5-RRC message). For example, in step 431, relay UE 402 can let gNB 403 know how many remote UE are connected to itself so that gNB 403 can make better scheduling decision.

A relay UE also can broadcast some information to assist remote UE do better relay (re)selection. For example, in step 432, relay UE 402 can broadcast its Uu link quality from base station, Uu throughput from base station, supportable throughput/bandwidth for a remote UE (e.g. how much UL/DL bandwidth/throughput/data rate a remote UE can acquire if it selects this relay UE), average packet latency in Uu link (may be different for UL and DL), or average packet latency of a relay packet (e.g. for UL, it could be the average latency from when a packet (e.g. RLC PDU) of a remote UE is received by the relay UE to when this packet is transmitted to/received by the gNB). Relay UE could also broadcast how many remote UEs are attaching to itself (i.e., relay load), or how many remote UEs are attaching to itself with active traffic. This could affect the resource allocation to each remote UE. For latency related information, relay UE can also broadcast its hop counts from base station.

In one embodiment, during discovery procedure, a relay UE can broadcast its load information, when remote UE do relay (re)selection, besides the PC5-RSRP measurements results, it also consider load information (e.g., number of remote UE already attach on this relay UE), for example, if the load exceed a threshold the remote UE doesn't consider this relay UE as its candidate relay UE. The threshold can be configured by gNB or SIB (for in coverage case) or pre-configuration (for out of coverage case). For example, if the load exceed a threshold, remote UE consider this candidate relay UE with a lower priority than those candidate relay UEs with a load below threshold.

In step 441, remote UE 401 performs relay selection and/or reselection. For directly comparison, gNB 403 can (pre-)configure an offset to remote UE via Uu interface before, when PC5-RSRP is offset better than Uu-RSRP, the relay UE can be candidate of relay node. For indirectly comparison, gNB 403 can (pre-)configure two thresholds for each interface, one is Uu-RSRP threshold (TH_Uu). The other one is PC5-RSRP threshold (TH_PC5). The remote UE can treat the relay UE as candidate when link quality of base station is lower than Uu-RSRP threshold (TH_Uu) and link quality of relay UE is better than PC5-RSRP threshold (TH_PC5). In step 451, a PC5-RRC connection is established between remote UE 401 and relay UE 402. In step 461, an end-to-end Uu-RRC connection is established between remote UE 401 and gNB 403 via the relay UE 402.

In one embodiment, different QoS requirement (e.g. corresponding to different PQI value, logical channel priority, or latency budget) may be mapped to different load threshold (i.e. multi-level threshold). For example, for a relay UE who cannot support short-latency relay (e.g., due to multiple hops to the base station, high load on the relay UE's PC5 or Uu interface, or other considerations), a remote UE with a delay-tolerant traffic may still select it as relay UE, but a remote UE running a delay-sensitive application will not select it as relay UE. In one embodiment, a remote UE consider a relay UE as a candidate relay UE if the relay UE provide the information of supportable data rate to the remote UE, and the supportable data rate can satisfy the sum of prioritized bit rate of all logical channels of this remote UE.

Figure 5:
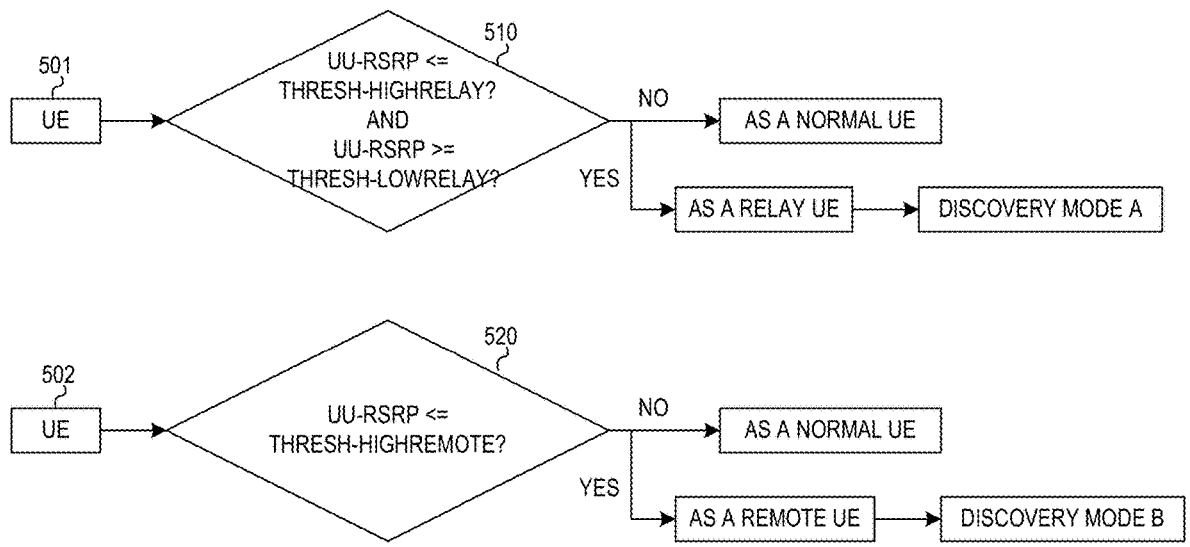
FIG. 5 illustrates one embodiment of baseline relay UE selection in accordance with one novel aspect.

FIG. 5 illustrates one embodiment of baseline relay UE selection in accordance with one novel aspect. In the embodiment of FIG. 5, UE 501 first measures its radio signal quality of a Uu interface with a base station. The radio signal quality may be Uu reference signal received power (Uu-RSRP). In step 510, UE 501 determines whether its Uu-RSRP<= threshHighRelay and Uu-RSRP> threshLowRelay. If the answer is no, then UE 501 will operate as a normal UE, e.g., it will not become a relay UE and is not allowed to broadcast discovery message. UE 501 cannot relay other UEs traffic. If the answer is yes, then UE 501 will operate as a relay UE and discovery message can be broadcast. The relay UE will then go to discovery mode A, e.g., announce a ProSe Query Code on PC5 and monitor a ProSe Response Code on PC5, and relay other UEs traffic.

For UE 502, in step 520, it determines whether its Uu-RSRP<=threshHighRemote. If the answer is no, then UE 502 will operate as a normal UE, e.g., it will not become a remote UE and is not allowed to broadcast discovery message. UE 502 cannot ask other UE to relay traffic. If the answer is yes, then UE 502 will operate as a remote UE and discovery message can be sent. The remote UE will then go to discovery mode B, e.g., monitor a ProSe Query Code on PC5 and announce a ProSe Response Code on PC5 if a ProSe Query Code Matches.

Figure 6:
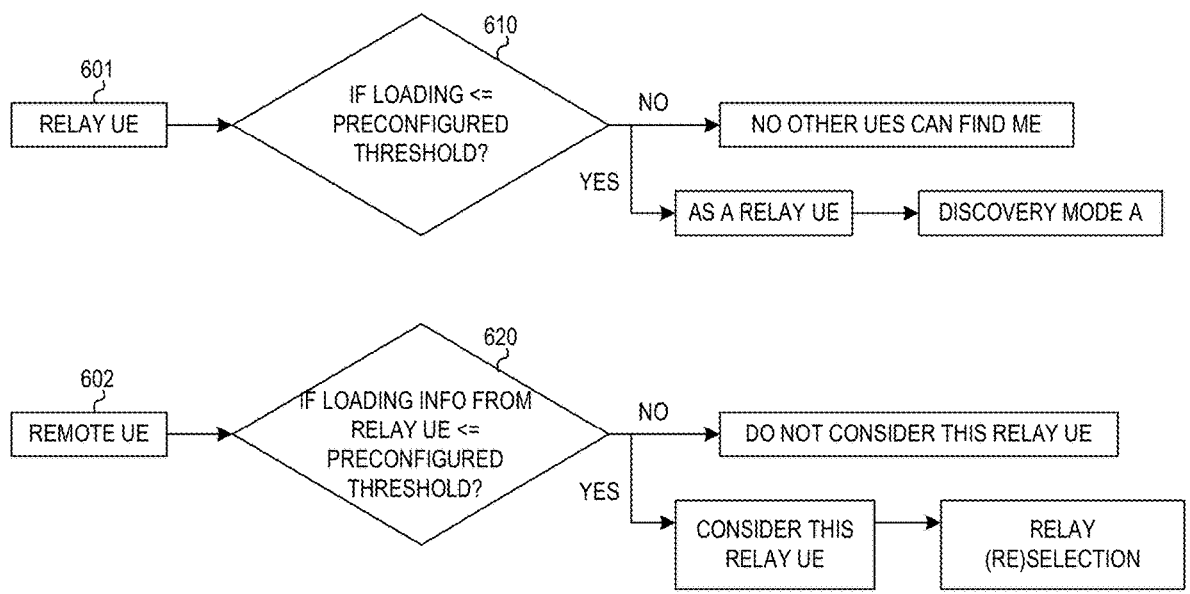
FIG. 6 illustrates one embodiment enhanced relay UE selection in accordance with one novel aspect.

FIG. 6 illustrates one embodiment enhanced relay UE selection in accordance with one novel aspect. In the embodiment of FIG. 6, relay UE 601 first determines its loading information, e.g., number of served remote UEs. In step 610, relay UE 601 determines whether its loading <= a preconfigured threshold. If the answer is no, then UE 601 is not allowed to broadcast discovery message, and no more remote UEs can find UE 601. If the answer is yes, then UE 601 will operate as a relay UE and discovery message can be broadcast. The relay UE 601 will then go to discovery mode A, e.g., announce a ProSe Query Code on PC5 and monitor a ProSe Response Code on PC5, and relay other UEs traffic.

For remote UE 602, in step 620, it receives broadcasted loading information and determines whether the loading from Relay UE <= a preconfigured threshold. If the answer is no, then remote UE 602 will not consider this relay UE as candidate. If the answer is yes, then remote UE 602 will consider this relay UE as candidate. Remote UE 602 may select or reselect this relay UE for traffic relaying.

Figure 7:
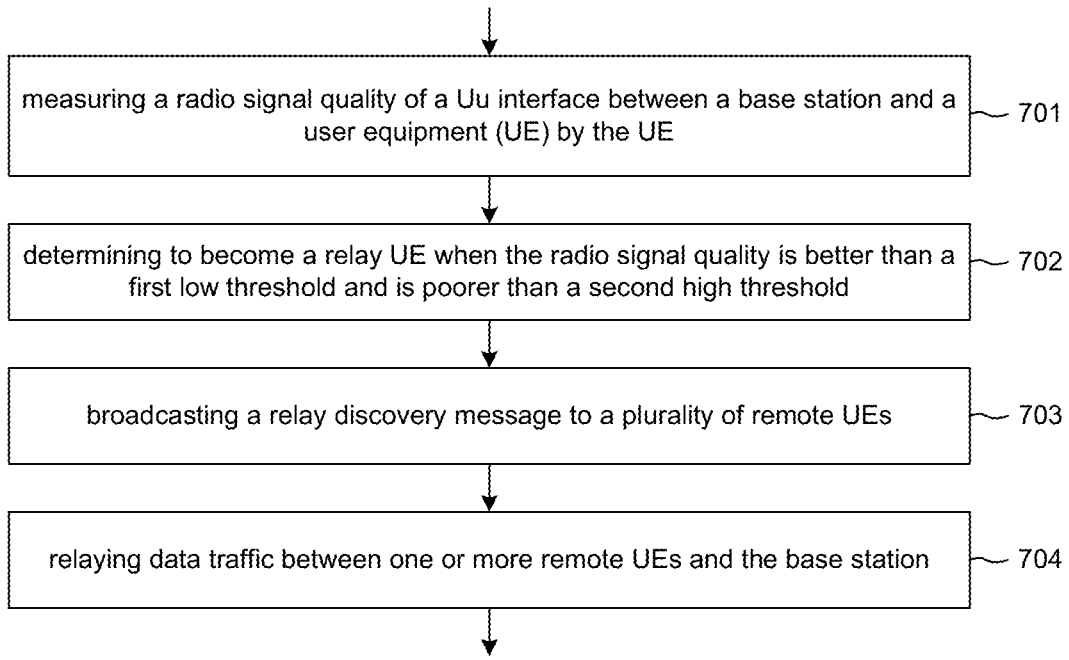
FIG. 7 is a flow chart of a method of relay UE discovery and selection from relay UE perspective in accordance with one novel aspect.

FIG. 7 is a flow chart of a method of relay UE discovery and selection from relay UE perspective in accordance with one novel aspect. In step 701, a UE measures a radio signal strength or quality of a Uu interface between a base station and the UE. In step 702, the UE determines to become a relay UE when the radio signal strength or quality is better than a first low threshold and is poorer than a second high threshold. In step 703, the relay UE broadcasts a discovery message to a plurality of remote UEs. In step 704, the relay UE relays data traffic between one or more remote UEs and the base station.

Figure 8:
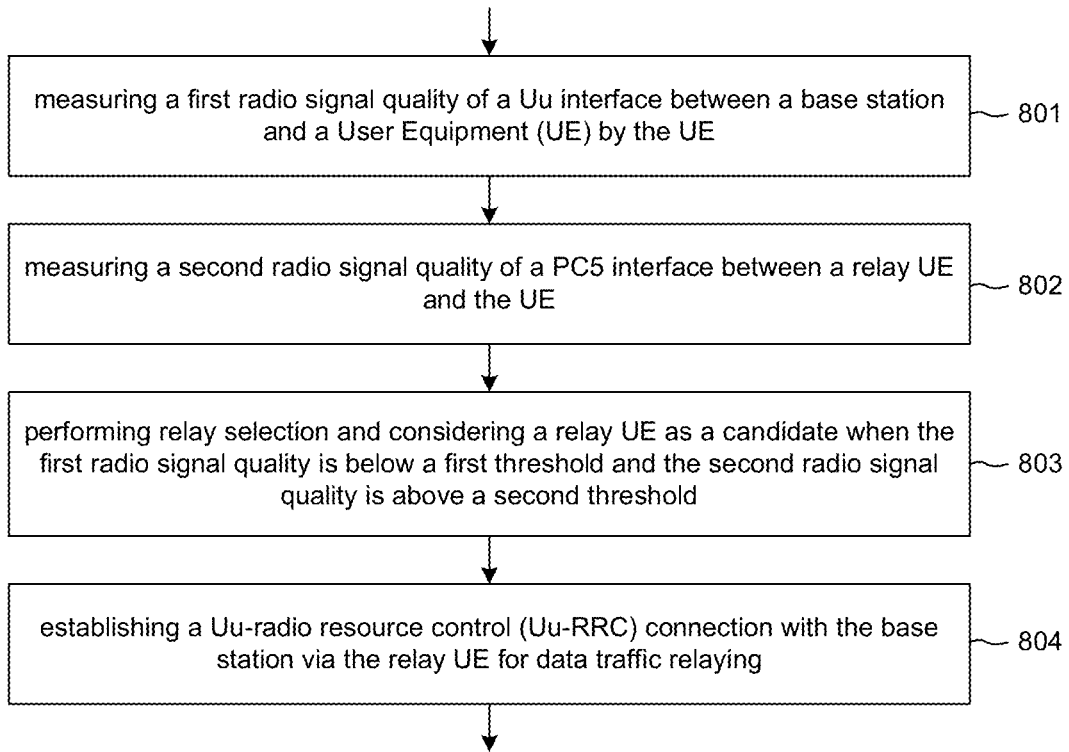
FIG. 8 is a flow chart of a method of relay UE discovery and selection from remote UE perspective in accordance with one novel aspect.

FIG. 8 is a flow chart of a method of relay UE discovery and selection from remote UE perspective in accordance with one novel aspect. In step 801, a UE measures a first radio signal strength or quality of a Uu interface between a base station and the UE. In step 802, the UE measures a second radio signal strength or quality of a PC5 interface between a relay UE and the UE. In step 803, the UE performs relay selection and selecting a relay UE as a candidate when the first radio signal strength or quality is below a first threshold and the second radio signal strength or quality is above a second threshold. In step 804, the UE establishes a Uu-radio resource control (Uu-RRC) connection with the base station via the selected relay UE for data traffic relaying. In one embodiment, the UE considers additional criteria such as relay load other than purely radio signal quality (e.g., RSRP) criteria for relay selection.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
    measuring, by a user equipment (UE), a radio signal strength or quality of a Uu interface between a base station and the UE,
    wherein the radio signal strength or quality is defined as a Uu reference signal received power (Uu-RSRP);
    determining to become a relay UE when the radio signal strength or quality is better than a first low threshold and is poorer than a second high threshold,
    wherein the second high threshold can be configured via RRC message from the base station;
    broadcasting a relay discovery message to a plurality of remote UEs; and
    relaying data traffic between one or more remote UEs and the base station.

2. The method of claim 1, wherein the UE becomes a relay UE only when a determined load of the UE is below a load threshold.

3. The method of claim 2, wherein the load comprises at least one of a number of remote UEs attached to the relay UE, a percentage of buffer data divided by a buffer size of the relay UE, and a resource utilization or capacity of the relay UE.

4. The method of claim 2, wherein the load threshold is pre-configured or configured by a base station via radio resource control (RRC) signaling.

5. The method of claim 1, wherein the UE broadcasts assistance information including load information to the plurality of remote UEs.

6. The method of claim 1, wherein the UE transmits assistance information including load information to the base station.

7. A User Equipment (UE), comprising:
    a measurement circuit that measures a radio signal strength or quality of a Uu interface between a base station and the UE,
    wherein the radio signal strength or quality is defined as a Uu reference signal received power (Uu-RSRP)
    a control circuit that determines to become a relay UE when the radio signal strength or quality is better than a first low threshold and is poorer than a second high threshold,
    wherein the second high threshold can be configured via RRC message from the base station;
    a transmitter that broadcasts a relay discovery message to a plurality of remote UEs; and a traffic relay handling circuit that relays data traffic between one or more remote UEs and the base station.

8. The UE of claim 7, wherein the UE becomes a relay UE only when a determined load of the UE is below a load threshold.

9. The UE of claim 8, wherein the load comprises at least one of a number of remote UEs attached to the relay UE, a percentage of buffer data divided by a buffer size of the relay UE, and a resource utilization or capacity of the relay UE.

10. The UE of claim 8, wherein the load threshold is pre-configured or configured by a base station via radio resource control (RRC) signaling.

11. The method of claim 7, wherein the UE broadcasts assistance information including load information to the plurality of remote UEs.

12. The method of claim 7, wherein the UE transmits assistance information including load information to the base station.

13. A method, comprising:
Measuring, by a User Equipment (UE), a first radio signal strength or quality of a Uu interface between a base station and the UE,
wherein the radio signal strength or quality is defined as a Uu reference signal received power (Uu-RSRP);
measuring a second radio signal strength or quality of a PC5 interface between a relay UE and the UE;
performing relay selection and selecting a relay UE as candidate when the first radio signal strength or quality is below a first threshold and the second radio signal strength or quality is above a second threshold,
wherein the second threshold can be configured via RRC message from the base station; and
establishing a Uu-radio resource control (Uu-RRC) connection with the base station via the selected relay UE for data traffic relaying.

14. The method of claim 13, further comprising:
receiving load information broadcasted from the relay UE during a relay discovery procedure.

15. The method of claim 14, wherein the UE further considers the load information for relay selection.

16. The method of claim 14, wherein the load comprises at least one of a number of remote UEs attached to the relay UE, a percentage of buffer data divided by a buffer size of the relay UE, and a resource utilization or capacity of the relay UE.

17. The method of claim 14, wherein the UE selects the relay UE as candidate when a load of the relay UE is below a load threshold.

18. The method of claim 17, wherein the load threshold is pre-configured or configured by the base station via RRC signaling.

* * * * *